United States Patent [19]

Mura

[11] 4,230,608
[45] Oct. 28, 1980

[54] STABLE WATER-IN-OIL EMULSIONS OF CATIONICALLY MODIFIED QUATERNIZED POLYACRYLAMIDE AND THEIR METHOD OF PREPARATION

[75] Inventor: Lawrence A. Mura, Homewood, Ill.

[73] Assignee: Nalco Chemical Company, Oak Brook, Ill.

[21] Appl. No.: 908,181

[22] Filed: May 22, 1978

[51] Int. Cl.³ ............................................... C08K 5/51
[52] U.S. Cl. ............................................ 260/29.4 UA
[58] Field of Search .............. 260/29.4 UA, 29.6 HN, 260/29.6 MP, 45.7 PT, 29.6 CM

[56] References Cited

U.S. PATENT DOCUMENTS

| | | | |
|---|---|---|---|
| 2,516,980 | 8/1950 | Gray | 260/45.7 PT |
| 4,010,131 | 3/1977 | Phillips | 260/29.4 UA |
| 4,120,840 | 10/1978 | Hurlock | 260/29.4 UA |

OTHER PUBLICATIONS

J. F. Walker, "Formaldehyde", Reinhold Pub., London, pp. 256-257, 1964.
K. Moedritzer et al., "J. Am. Chem. Soc.", vol. 31, May 1966, pp. 1603-1607.

*Primary Examiner*—Paul R. Michl
*Attorney, Agent, or Firm*—John G. Premo; Robert A. Miller; John S. Roberts, Jr.

[57] ABSTRACT

Water-in-oil emulsions of polyacrylamide or other water soluble vinyl addition polymers having amide functionality can be reacted with formaldehyde and a secondary amine containing 2-8 carbon atoms followed by quaternization to prepare water-in-oil emulsions of quaternized cationically modified polyacrylamides.

The resultant water-in-oil emulsions are stabilized against cross linking by the addition to the water-in-oil emulsions of an aqueous solution of a water soluble phosphorous compound having a P—H bond. The phosphorous containing compound is added in such a quantity so as to provide from 1.6-25% by weight of the phosphorous compound based on the weight of the polymer contained within the water-in-oil emulsion and to simultaneously adjust the pH of the water-in-oil emulsion to a range of between 3.5-5.0. The stabilized water-in-oil emulsions can be readily inverted into aqueous solution causing the solubilization of the polymer in the aqueous without the need for heating the water-in-oil emulsion at high temperatures for extended periods of time.

9 Claims, No Drawings

STABLE WATER-IN-OIL EMULSIONS OF CATIONICALLY MODIFIED QUATERNIZED POLYACRYLAMIDE AND THEIR METHOD OF PREPARATION

INTRODUCTION

This invention relates to an improved stabilized water-in-oil emulsion of a cationically modified polyacrylamide. The polymers which are the subject of this invention are prepared by subjecting a water-in-oil emulsion of an acrylamide polymer to the Mannich reaction followed by quaternization of the resultant polymer with an alkylating agent.

Water-in-oil emulsions of this type are known in the prior art and are fully described in U.S. Pat. No. 4,010,131 which is hereinafter incorporated by reference. While cationically modified acrylamide polymers of this type have found great utility in industry, the use of materials of this type has been held back due to the fact that no acceptable method for the stabilization of this type of polymer could be found. While various methods have been tried, none have been successful.

U.S. Pat. No. 4,010,131 describes the stabilization of materials of this type utilizing "oxygen-containing halogen-free inorganic acids" and most particularly, sulfurous acid. Unfortunately, the addition of sulfur dioxide or the like to emulsion materials such as those described often resulted in unstable emulsions and, in addition, did not satisfactorily stabilize the resultant materials against cross linking through methylol groups in the polymer chain. Other workers in the field disclose the use of various amine-type materials in aqueous solutions which should theoretically react with any excess formaldehyde that may be present, thus preventing methylol cross linking. Unfortunately, this technique has also been proven unsatisfactory in commercial usage.

U.S. Ser. No. 763,477 filed Jan. 28, 1977, assigned to the assignee of the instant application, discloses the stabilization of water-in-oil emulsions of polytrimethylamino methylol acrylamide by the use of orthophosphorous acid. While ultimately preparing a stable material, this application requires the use of excess secondary amine, states that the pH of the final emulsion is critical, but the amount of acid added is deemed not critical and furthermore, requires that the emulsion be heated at elevated temperatures for extensive periods of time after the phosphorous acid has been added to obtain the stabilizing effect.

The time and post-heat step in this method have proven so costly in commercial manufacture as to prohibit the practice of this invention commercially. I have discovered, however, that when a given amount of a phosphorous acid is added to a water-in-oil emulsion of an acrylamide polymer modified in this manner, which phosphorous acid is added to the latex to obtain a specific pH, and is furthermore added as an aqueous solution having a certain pH, the stabilization of water-in-oil emulsions of cationically modified polyacrylamides of this type can be affected rapidly without excess secondary amine being present and without any post-heat step.

OBJECTS

It is, therefore, the object of this invention to provide to the art an improved stabilized water-in-oil emulsion of a cationically modified acrylamide polymer.

A further object of this invention is to provide to the art a method for the stabilization of water-in-oil emulsions of cationically modified acrylamide polymers.

Other objects will appear hereinafter.

The products which are the subject of this invention are made in several steps. First, a water-in-oil emulsion of polyacrylamide or other water soluble vinyl addition polymer containing amide groups is formed. This water-in-oil emulsion is then reacted with formaldehyde and a secondary amine containing from 2–8 carbon atoms to produce a cationically modified polymer contained within the water-in-oil emulsion. The polymer within the water-in-oil emulsion is then quaternized using well known alkylating agents. This step is followed by the stabilization steps of this invention.

THE INVENTION

THE WATER-IN-OIL EMULSIONS OF WATER SOLUBLE ACRYLAMIDE POLYMERS

The water-in-oil emulsions of water soluble vinyl addition polymers which can be modified and subsequently stabilized according to this invention contain four basic components. These components and their weight percentages in the emulsions are listed below:

A. Water soluble acrylamide polymer:
  1. Generally from 5–60%,
  2. Preferably from 20–40%; and
  3. Most preferably from 25–35%;
B. Water:
  1. Generally from 20–90%;
  2. Preferably from 20–70%; and
  3. Most preferably from 30–55%;
C. Hydrophobic liquid:
  1. Generally from 5–75%;
  2. Preferably from 5–40%; and
  3. Most preferably from 20–30%; and
D. Water-in-oil emulsifying agent:
  1. Generally from 0.1–21%;
  2. Preferably from 1–15%; and
  3. Most preferably from 1.2–10%.

It is also possible to further characterize the water-in-oil emulsions of water soluble acrylamide polymers with respect to the aqueous phase of the emulsions. This aqueous phase is generally defined as the sum of the polymer or copolymer present in the emulsion plus the amount of water present in the emulsion. This terminology may also be utilized in describing the water-in-oil emulsions which are useful in this invention. Utilizing this terminology, the aqueous phase of the water-in-oil emulsions of this invention generally consists of 25–95% by weight of the emulsion. Preferably, the aqueous phase is between 60–90% and most preferably from 65–85% by weight of the emulsion.

The emulsions also may be characterized in relation to the water/oil ratios. This figure is simply a ratio of the amount of water present in the emulsion divided by the amount of hydrophobic liquid present in the emulsion. Generally, the water-in-oil emulsions of this invention will have a water/oil ratio of from 0.25–18.0. Preferably, the water-in-oil ratio will range from 0.5–14.0, and most preferably from 1.0–2.75. The water-in-oil emulsion, after the modification steps of this invention, will still have the same ratios as enumerated above.

THE WATER SOLUBLE VINYL ADDITION POLYMERS

The water soluble vinyl addition polymers which are useful in this invention are those containing a majority of amide functional groups. Polymers which fall into this category include polyacrylamide, polymethacrylamide, and various water-soluble copolymers of acrylamide and methacrylamide with monomers such as acrylic acid, methacrylic acid, dimethylaminoethyl methacrylate, etc. The preferred polymers for use in this invention are polyacrylamides. When using a copolymer of acrylamide with another monomer, the resultant polymer should contain at least 50% by weight acrylamide or methacrylamide units.

The molecular weight of these polymers may range from several thousands to many million. Due to the nature of the modification which is carried out in later reaction steps, it is preferred that the polymers employed in this invention generally have intrinsic viscosities of from 3–9 as measured in 1.0 molar sodium nitrate. This corresponds to an approximate molecular weight range of from 800,000 to 4 million. As will be seen by those skilled in the art, higher molecular weight materials can be utilized. However, if any cross linking whatever occurs during latex reaction steps with higher molecular weight materials, oftentimes the resultant polymer will be water insoluble.

THE HYDROPHOBIC LIQUIDS

The hydrophobic liquids or oils used in preparing these emulsions may be selected from a large group of organic liquids which include liquid hydrocarbons and substituted liquid hydrocarbons.

A preferred group of organic liquids that can be utilized in the practice of this invention are paraffinic hydrocarbon oils. Examples of these types of materials include a branch-chain isoparaffinic solvent sold by Humble Oil and Refinery Company under the tradename "Isopar M" described in U.S. Pat. No. 3,624,019 and a paraffinic solvent sold by the Exxon Company, U.S.A., called "Low Odor Paraffinic Solvent." Typical specifications of this material are set forth below in Table I.

Due to the nature of the modifications later to be carried out upon the water-in-oil emulsion of polyacrylamide, it is often-times necessary to add more hydrophobic liquid at some point in the reaction so as to balance or compensate for the amount of water being added at later steps.

TABLE I

| | |
|---|---|
| Specific Gravity 60°/60° F. | 0.780–0.806 |
| Color, Saybolt | + 30 min. |
| Appearance, visual | Bright and Clear |
| Aniline Point, °F., ASTM D-611 | 160 min. |
| Distillation, °F., ASTM D-86 | |
| IBP | 365 min. |
| FBP | 505 max. |
| Flash Point, °F., TCC | 140 min. |
| Sulfur, ppm, Microcoulometer | 15 max. |

While paraffinic oils are the preferred materials for use in preparing the water-in-oil emulsions of this invention, other organic liquids can be utilized. Thus, mineral oils, kerosenes, naphthas, and in certain instances petroleum may be used. While useful in this invention, solvents such as benzene, xylene, toluene and other water immiscible hydrocarbons having low flash points or toxic properties are generally avoided due to problems associated with their handling.

THE WATER-IN-OIL EMULSIFYING AGENTS

Any conventional water-in-oil emulsifying agent can be used such as sorbitan monostearate, sorbitan monooleate, and the so-called low HLB materials which are all documented in the literature and are summarized in the Atlas HLB Surfactants Selector. Although the mentioned emulsifiers are used in producing good water-in-oil emulsions, other surfactants may be used as long as they are capable of producing these emulsions. It is also contemplated, however, that other water-in-oil emulsifying agents can be utilized.

It should be pointed out that in the selection of an emulsifier system for the polyacrylamide backbone emulsion care should be taken to avoid emulsifiers which will react with any of the additives or reactants which are later added to the emulsion.

In addition, oftentimes due to the nature of the modification of the polyacrylamide contained within the water-in-oil emulsion, multiple component emulsifier systems are utilized. This is generally standard practice among those familiar with the art of emulsification, and thus, the selection process for the emulsifier need not be elaborated on at this point.

In addition, water-in-oil emulsions of polyacrylamide which have been made utilizing an emulsifier which may be reactive to any of the ingredients later added may be utilized in the process of this invention by adding additional surfactant to the latex. Preferred emulsifier systems will be discussed at a later point in this specification.

U.S. Pat. No. 3,997,492 shows the use of emulsifiers generally having higher HLB values to produce stable emulsions similar in character to those discussed above. With the use of the equations present in this reference, which is hereinafter incorporated by reference, emulsifiers having HLB values between 4–9 can be utilized in the practice of this invention.

In addition to the reference described above, U.S. Pat. No. 4,024,097 discloses particular emulsifying agents for the water-in-oil emulsions, which are the subject of this invention. These emulsions are generally prepared according to this reference utilizing a water-in-oil emulsifying agent comprising a partially esterfied lower N,N-dialkanol substituted fatty amide. Additionally, other surfactants may be combined to produce emulsions having small particle sizes and excellent storage stability.

THE PREPARATION OF THE WATER-IN-OIL EMULSIONS OF WATER SOLUBLE ACRYLAMIDE POLYMERS

The general method for the preparation of emulsions of the type described above is contained in Vanderhoff, U.S. Pat. No. 3,284,393, which is hereinafter incorporated by reference. A typical procedure for preparing water-in-oil emulsions of this type includes preparing an aqueous solution of a water soluble acrylamide monomers and adding this solution to one of the hydrocarbon oils described above. With the addition of a suitable water-in-oil emulsifying agent and under agitation, the emulsion is then subjected to free radical polymerization conditions and a water-in-oil emulsion of the water soluble acrylamide polymer is obtained. It should be pointed out that the ingredients are chosen based upon the weight percentages given above and their compatability with each other. As to choice of free radical catalyst, these materials may be either oil or water soluble and may be from the group consisting of organic peroxides, Vazo type materials, redox type initiator systems, etc. Additionally ultraviolet light, microwaves, etc. will also cause the polymerization of water-in-oil emulsions of this type.

In the manufacture of emulsions of this type, which are further detailed in U.S. Pat. No. 3,624,019, reissue 28,474, U.S. Pat. No. 3,734,873, reissue 28,576, U.S. Pat. No. 3,826,771, all of which are hereinafter incorporated by reference, the use of air may be employed to control polymerization. This technique is described in U.S. Pat. No. 3,767,629 which is also hereinafter incorporated by reference.

In addition to the above references, U.S. Pat. No. 3,996,180 describes the preparation of water-in-oil emulsions of the types utilized in this invention by first forming an emulsion containing small particle size droplets between the oil, water, monomer and water-in-oil emulsifying agent utilizing a high shear mixing technique followed by subjecting this emulsion to free radical polymerization conditions. Also of interest is U.S. Pat. No. 4,024,097 which describes water-in-oil emulsions such as those described above utilizing particular surfactant systems for the water-in-oil emulsifying agent, allowing for the preparation of latexes having small polymer particle sizes and improved storage stability.

Another reference, U.S. Pat. No. 3,915,920, discloses stabilizing water-in-oil emulsions of the type above described utilizing various oil-soluble polymers such as polyisobutylene. Employment of techniques of this type provide for superior stabilized emulsions.

Of still further interest is U.S. Pat. No. 3,997,492 which describes the formation of water-in-oil emulsions of the type above described utilizing emulsifiers having HLB values of between 4–9.

PHYSICAL PROPERTIES OF THE WATER-IN-OIL EMULSIONS

The water-in-oil emulsions of the finely divided water-soluble acrylamide polymers useful in this invention contain relatively large amounts of polymer. The polymers dispersed in the emulsion are quite stable when the particle size of the polymer is from the range of 0.1 microns up to about 5 microns. The preferred particle size is generally within the range of 0.2 microns to about 3 microns. A most preferred particle size is generally within the range of 0.2 to 2.0 microns.

The emulsions prepared having the above composition generally have a viscosity in the range of from 50 to 1000 cps. It will be seen, however, that the viscosity of these emulsions can be affected greatly by increasing or decreasing the polymer content, oil content, or water content as well as the choice of a suitable water-in-oil emulsifier.

Another factor attributing to the viscosity of these types of emulsions is the particle size of the polymer which is dispersed in the discontinuous aqueous phase. Generally, the smaller the particle obtained the more viscous the emulsion. At any rate, it will be readily apparent to those skilled in the art as to how the viscosity of these types of materials can be altered. It will be seen that all that is important in this invention is the fact that the emulsion be somewhat fluid, ie. pumpable.

PREPARATION OF THE MANNICH AMINE

The water-in-oil emulsions of the water soluble acrylamide polymers are then subjected to a mannich reaction. This reaction involves reacting the polymer contained within the emulsion with formaldehyde and a secondary amine containing from 2–8 carbon atoms. This procedure is fully described in U.S. Pat. No. 3,979,348 which is hereinafter incorporated by reference. In conducting this reaction, equal molar amounts of secondary amine and formaldehyde are preferred. When using the preferred secondary amine, dimethylamine, no improvement in reaction has been seen from the use of up to 15% excess dimethylamine or by the use of an excess formaldehyde that can be tolerated has not been thoroughly investigated, it would be expected from a reaction point of view that excess formaldehyde will be detrimental since it can cause cross linking of the polymer at later stages.

In the addition of the secondary amine-formaldehyde reactants to the water-in-oil emulsion, the use of a secondary amineformaldehyde premix such as that described in U.S. Pat. No. 3,979,348 has produced better materials than the simultaneous addition of both reactants. Addition of the secondary amine and formaldehyde simultaneously to the latex does not reduce product activity, but some instability of the latex causing "grittiness" may occur. Addition of all of the secondary amine before the formaldehyde gels the latex. The addition of formaldehyde first induces cross linking and should also be avoided.

Useful secondary amines in the practice of this invention include dimethylamine, methylethylamie, diethylamine, diisopropylamine, dibutylamine, morpholine and piperidine. The secondary amines utilized can be aliphatic, cyclic, straight chain or branched. The preferred secondary amine for use in the practice of this invention is dimethylamine. With the use of dimethylamine, the polymer prepared will be poly(N,N-dimethylamino methyleneacrylamide).

In carrying out this phase of the preparation of my cationically modified acrylamide polymer latex, a premix of secondary amine-formaldehyde is generally added slowly to the emulsion at temperatures ranging from 25°–90° C. The preferred temperature for carrying out the reaction is from 25°–50° C. I have found that the reaction is essentially complete after a span of about two hours at a temperature of 45° C. It should be noted that both higher and lower temperatures can be utilized, but it is preferred to use as low a temperature as possible to avoid inducing cross linking from any unreacted formaldehyde.

When starting with a polyacrylamide homopolymer the resulting mannich amine latex generally is 75–80% cationically charged and is stable for short periods of time.

THE QUATERNIZATION OF THE MANNICH AMINE LATEX

The mannich amine latex formed above is then reacted with an alkylating agent to produce a quaternary modified material. The quaternization is generally carried out at temperatures of from 30°–40° C. at times ranging from 1–5 hours. While the reaction can be conducted satisfactorily at lower temperatures than those specified, I have found that temperatures for the quaternization reaction in excess of 45° C. should be avoided.

When working with gaseous alkylating agents, it is important that the reaction be conducted in a pressurized vessel. For example, when working with methyl chloride, pressures of up to 100 psig should be planned for. Although the alkylating agent is generally soluble in the hydrocarbon liquid employed in the water-in-oil emulsions of this invention thus limiting pressure problems, the maintenance of sufficient pressure is important when using these types of materials. The pressure operated at is not believed to be a critical part of this invention.

Alkylating agents which are particularly useful in this invention include methyl halides and dimethyl sulfate. Other alkylating agents which may be useful include benzyl chloride, $C_1$–$C_4$ alkylene oxides and other well known quaternizing agents. Still other alkylating agents that may find utility are $C_2$–$C_4$ alkyl halides. Preferred alkylating agents include methyl chloride and dimethyl sulfate. When alkyl halides are utilized, the halide portion of the molecule may be selected from chlorine, bromine and iodine. This phase of the reaction is descrbed in U.S. Pat. No. 4,010,131. Resultant cationically modified quaternized water soluble acrylamide polymers have cationic charge densities of approximately 60–65% and give good flocculant activity. Unfortunately, to maintain the activity of unstabilized materials of this type, products must be stored at or near 0° C. to avoid degradation.

When dimethylamine is utilized as the secondary amine, and methyl chloride is utilized as the alkylating agent, the resultant polymer will be poly(N-acrylamidomethyl-N,N,N-trimethylammonium) chloride.

THE STABILIZATION

It is known in the prior art that formaldehyde reacts with acrylamide to produce methylol acrylamide linkages which can later cross link, causing insolubility, and the loss of cationic charge in the resultant polymer. Artesians in the prior art have suggested the use of amines (U.S. Pat. No. 3,988,277) and "oxygen-containing halogen-free inorganic acids" (U.S. Pat. No. 4,010,131) as stabilizers for materials of this type. Unfortunately, these methods have met with little success oftentimes due to the fact that they did not provide a stable enough material to be useful. While the use of phorphorous acid has been suggested as a stabilizer for water-in-oil emulsions of this type (Ser. No. 763,477 filed Jan. 28, 1977) the stabilization step described produced unsatisfactory results, requiring the necessity for heating the resultant "stabilized" emulsion for lengthy periods of time at high temperatures. While stabilization was apparently accomplished during this period of time, polymer degradation also occurred during this heating step.

I have found that by adding from 0.1–25% phosphorous acid based on the weight of the polymer contained in the water-in-oil emulsion to the water-in-oil emulsion in a particular manner, water-in-oil emulsions of the quaternized cationically modified polymer can be utilized.

In the practice of my invention, an aqueous solution of phosphorous acid having a preadjusted pH value is added to the latex. While the final pH of the latex is important to the stability of the resultant water-in-oil emulsion and the polymer contained therein, phosphorous acid is ineffective as a stabilizer at a latex pH of 1.0 and likewise tends to lose effectiveness as the latex pH ranges above 5.5. The preferred pH of my stabilized water-in-oil emulsion is generally between 3.5–5.0, and most preferably, a pH of between 4.0–4.4 appears to be optimum.

The phosphorous acid is added to the water-in-oil emulsion as an aqueous solution having a pH of from 2.0 to 4.0 and preferably from 3.0–4.0. This adjustment is accomplished by adding to an aqueous solution of phosphorous acid, a base which will raise the pH. Among the bases which we have utilized and which will perform satisfactorily in this invention are dimethylamine and sodium hydroxide. It is suspected and it is within the terms of this invention that other water soluble basic materials such as ammonia, lower alkyl primary, secondary and tertiary amines, other alkali metal hydroxides and the like will also perform in this segment of my invention. The amount of base to be added to the phosphorous acid will be readily apparent to those skilled in the art. Knowing the desired pH value of the water-in-oil emulsion and knowing the percentage of phosphorous acid which must be added to the water-in-oil emulsion, a pH for the starting solution of phosphorous acid can readily be determined.

While as discussed above, the stabilization of my water-in-oil emulsion is pH dependent, pH adjustment alone will not cause stabilization.

It appears that form 1.6–25% and preferably 3.2–15% phosphorous acid must be added based on the weight of the polymer contained in the water-in-oil emulsion. Most preferably, from 3.2–9% phosphorous acid is added based on the weight of the polymer contained in the water-in-oil emulsion. A preferred level of phosphorous acid based on the weight of the polymer-contained within the water-in-oil emulsion is approximately 6.0%. Adding phosphorous acid above this amount appears to produce negligible increases in stability, at least where there is no calculated excess formaldehyde present.

While my stabilization has been described above as effective with phosphorous acid, other phosphorous containing compounds containing a P-H bond can be utilized. These materials should be water soluble and may encompass orthophosphorous acid and hypophosphorous acid. Other phosphorous containing compounds having a P-H bond which can be utilized as stabilizers in this invention include alkali metal hypophosphites and alkali metal phosphites. Examples of these materials which are known to perform satisfactorily in this invention include sodium phosphite and sodium hypophosphite. When the phosphorous containing compounds having a P-H bond are utilized in this invention, it is important that aqueous solutions of materials of this type have their pH adjusted to the required levels before addition to the water-in-oil emulsion with an acid or base as called for in this specification.

To briefly summarize, the stabilization steps of this invention are accomplished by adding to the quaternized cationically modified acrylamide polymer emulsion, phosphorous acid in sufficient quantity to:

A. Hold the pH of the water-in-oil emulsion at a level of from 3.5–5.0; and,

B. Maintain a concentration of phosphorous acid within the emulsion so as to react with any unreacted formaldehyde or methylol groups which may be present.

I have found that the addition of neat phosphorous acid directly to the emulsion shocks the material and results in an unstable material. On the contrary, however, when the phosphorous acid is made up in an aqueous solution having a pH from the range of from 2–4 and a quantity of this solution is added to the emulsion in a quantity to provide from 0.1–25% by weight phosphorous acid based on the weight of the polymer contained within the water-in-oil emulsion and to provide the water-in-oil emulsion with a pH of from 3.5–5.0 superior stability of the emulsion is obtained. This aqueous solution should also contain a base sufficient to control the pH of the aqueous solution of phosphorous acid to within the range of 2–4. Both addition of the phosphorous acid to the emulsion and pH adjustment of the emulsion is thus conducted simultaneously.

The exact quantities of each of the ingredients utilized in preparing the aqueous phosphorous acid solutions will be readily determined by those skilled in the art based on the parameters given above. Thus, knowing the pH of the emulsion, the percent phosphorous acid which the emulsion should contain, and the pH value of the aqueous solution, the exact amount of components can be readily calculated. It should be pointed out, however, that if an excessive quantity of aqueous solution need be added to the water-in-oil emulsion, it is possible that additional hydrophobic oil should also be added. This is necessary so as to essentially maintain the oil/water ratio present in the emulsion and insure the stability of the final material.

In the addition of the aqueous phosphorous acid solution to the water-in-oil emulsions of the quaternary modified polyacrylamide, sequential addition of phosphorous acid and base has been found to cause latex gellation. Simultaneous addition of phosphorous acid and base has been found to be unpredictable upon the water-in-oil emulsion, often causing large particle formation in the water-in-oil emulsion.

The addition of the phosphorus acid to the water-in-oil emulsion is carried out by simply adding the aqueous phosphorous acid solution to the emulsion with agitation. The solution should be added at a rate so as not to shock the water-in-oil emulsion, but fairly rapid rates have been employed with success.

The temperature of addition may range considerably. Preferably, the addition is carried out at or near ambient temperature often necessitating cooling the water-in-oil emulsion to maintain this temperature. It is not believed that the exact temperature of addition is critical, however, elevated temperatures probably should be avoided.

The resultant stabilized water-in-oil emulsion of the cationically modified quaternized acrylamide polymer is stable, and the polymer contained within the emulsion is stabilized from cross linking. The resultant water-in-oil emulsion is stable and can be readily inverted in the presence of a hydrophilic surfactant.

THE INVERSION OF THE WATER-IN-OIL EMULSIONS OF THE WATER SOLUBLE CATIONICALLY MODIFIED QUATERNIZED ACRYLAMIDE POLYMERS

The water-in-oil emulsions of the water soluble cationically modified quaternized acrylamide polymers discussed above have unique ability to rapidly invert when added to aqueous solutions such as water in the presence of an inverting agent. Upon inversion, the emulsion releases the polymer into water in a very short period of time when compared to the length of time required to dissolve a solid form of the polymer. This inversion technique is described in Anderson et al U.S. Pat. No. 3,624,019, hereinafter incorporated by reference. As stated in that reference, the polymer-containing emulsions may be inverted by any number of means. The most convenient means resides in the use of a surfactant added to either the polymer-containing emulsion or the water into which it is to be placed. The placement of a surfactant into the water causes the emulsion to rapidly invert and release the polymer in the form of an aqueous solution. When this technique is used to invert the polymer-containing emulsion, the amount of surfactant present in the water may vary over a range of 0.01 to 50% based on the polymer. Good inversion often occurs within the range of 1–10% based on polymer.

The preferred surfactants utilized to cause the inversion of the water-in-oil emulsions of this invention when the emulsion is added to water are hydrophilic and are further characterized as being water soluble. While any hydrophilic type surfactant such as ethoxylated nonyl phenols, ethoxylated nonyl phenol formaldehyde resins, dioctyl esters of sodium succinate and octyl phenol polyethoxy ethanols, etc. can be used, preferred surfactants for use in inverting the water-in-oil emulsions of my invention are ethoxylated fatty alkyl amines.

I have found that the water-in-oil emulsions of polymers of this type are extremely stable and for reasons not understood, to obtain rapid inversion, care should be taken in the choice of suitable inverting surfactants. As such, surfactants such as Ethoduomeen ® T-25, an ethylene oxide condensate of N-tallow trimethylene diamine acetate available from the Armak Company are of the preferred class in this invention. It should be pointed out that I do not want to be limited to the use of the one surfactant above as the inverting agent since other hydrophilic surfactants will perform in this invention.

While the inversion of the water-in-oil emulsions have been described above with regard to the separate addition of surfactant to the aqueous media in which the emulsion is to be inverted it is within the scope of this invention to add the inverting surfactant directly to the water-in-oil emulsion. When done in this fashion, the inverting surfactant is generally added at the end of processing at a level of from 0.5–10% based on the weight of the water-in-oil emulsion.

Emulsions prepared according to my invention can generally be inverted directly into aqueous solutions using the techniques set forth in Anderson et al U.S. Pat. No. 3,624,019. Due to the cationic nature of the polymer contained within the water-in-oil emulsions, however, certain surfactant-polymer interaction may take place, occasionally, resulting in an over stabilized water-in-oil emulsion. When this happens, the resultant water-in-oil emulsion may require a longer period of time in which to fully invert thus causing the slower solubilization of the polymer contained within the emulsion. While as stated above, the reason for this phenomenon is not understood. It can be corrected in at least two ways.

One, a lower level of emulsifier can be used in the preparation of the water-in-oil emulsions of this invention. This causes the emulsion itself to be less stable and hence the inversion is more rapid. Another method which has found applicability when this phenomenon occurs is to heat the water-in-oil emulsion to an elevated temperature such as, for instance, 50° C. with agitation. This heating step apparently breaks down some of the surfactants, or at least destabilizes the emulsion, allowing for the emulsion's later rapid inversion when contacted with water.

It should be pointed out that the above methods are normally not utilized and furthermore, that if they must be utilized they should be experimented with on a case-by-case basis.

In order to illustrate this invention, the following examples are presented:

SYNTHESIS EXAMPLES

A water-in-oil emulsion of polyacrylamide was prepared as follows:

Into a container equipped with stirrer, thermometer, reflux condenser, addition funnel, and heating and cooling capabilities was added 1.59 parts of sorbitan monooleate dissolved in 29.3 parts of low odor paraffinic solvent (LOPS). This mixture was stirred. An aqueous phase was then prepared by preparing a solution containing 59.7 parts of a 46% by weight aqueous solution of acrylamide monomer, 8.81 parts water, 0.5 parts isopropyl alcohol, 0.003 parts ethylenediamine tetraacetic acid, tetrasodium salt. The pH of the solution is then adjusted to approximately 6.9 by the addition of NaOH (50%) or $H_2SO_4$ as necessary. This solution was stirred until homogeneous and then added to the container containing the LOPS. The mixture was stirred and purged with nitrogen for a period of time after which time it was heated to 50° C. and 0.04 parts of azobisiosbutyronitrile was added. The ensuing polymerization was exothermic and the temperature was controlled at from 51°-52° C. by cooling or heating, as necessary, for four hours. At the end of this period, the temperature was raised to 76.5° C. and held for one hour. A stable water-in-oil emulsion of polyacrylamide is recovered.

MANNICH REACTION

EXAMPLE "A"

To 53.17 parts of the water-in-oil emulsion of polyacrylamide prepared above was added 13.27 parts of low odor paraffinic solvent and 0.85 parts of Tween ® 61 polyoxyethylene (4) sorbitan monostearate (available from ICI America, Inc.) and 0.85 parts of Alkaterge ® T (available from Commercial Solvents Corp.), a substituted oxazoline. A formaldehyde-dimethylamine premix was prepared by weighing 53.39 parts of a 37% aqueous solution of formaldehyde into a flask. The flask was cooled to 15°-20° C. and at that time 47.61 parts of a 64% aqueous solution of dimethylamine was added over a half-hour period to the formaldehyde while maintaining the above temperature. The formaldehyde-dimethylamine adduct wad mixed for 15 minutes after the dimethylamine addition had been completed.

The polyacrylamide emulsion described above was then heated to 40° C. with agitation. Upon reaching 40° C., the premix of dimethylamine-formaldehyde prepared above was added slowly to the emulsion over a one hour period. After the premix had been added, the temperature was maintained at 40°-45° C. for five hours. The resultant cationically modified water-in-oil emulsion of polyacrylamide is labeled Product "A."

QUATERNIZATION

EXAMPLE "B"

88.92 parts of the water-in-oil emulsion of the cationically modified acrylamide polymer labeled "A" above was added to a suitable sized autoclave. To this material was then added over a one-two hour period 11.08 parts of methylchloride. The temperature during the methylchloride addition rose to 100° F. and pressure loss to 40 psig. The reaction mixture was held with agitation at 95°-100° F. for six hours. The resultant material had a cationic charge ranging from 60-65% and a final pH range from 5.5 to 6.5. The product was unstable and to maintain activity had to be stored at low temperatures. This material was labeled "B".

STABILIZATION SOLUTION

EXAMPLE "C"

A phosphorous acid stabilizer solution was prepared by weighing 33.45 parts of phosphorous acid into a beaker. 18.9 parts of water was then added slowly and the mixture was stirred until the phosphorous acid crystals had dissolved. The aqueous phosphorous acid solution was then cooled using an ice water cooling bath, and 37.6 parts of a 50% by weight aqueous solution of sodium hydroxide was added to the aqueous phosphorous acid mixture to raise the pH to 3.4 This solution was labeled "C."

STABILIZATION EXAMPLES

EXAMPLE I

This example shows the stability of stabilized and unstabilized water-in-oil emulsions of the quaternized cationically modified acrylamide polymer. One hundred grams of material "B" prepared above was placed in a stirred beaker. To this material was added 4.6 parts of the phosphorous acid solution labeled "C" to bring the pH to approximately 4.4. This material is labeled "D."

EXAMPLE II

The stability of samples "B" and "D" were compared. Samples "B" and "D" were aged at 40° C. and charge determinations were measured by colloid titration. Results are shown in Table II.

TABLE II

| Description | Initial Cationic Charge | 40° C. Aging Days | 40° C. Aging % Charge |
|---|---|---|---|
| "B" (unstabilized) | 64.7 | 8 | 27.4 |
| "D" (stabilized, pH 4.4) | 65.8 | 50 | 64.7 |

EXAMPLE III

This example is presented to show the pH dependency of the stabilization step of this invention. In this example, an unstabilized sample prepared according to the above description was utilized. In addition, one sample had phosphorous acid added to a sample of the latex directly at a level of from 5.9% based on the weight of the polymer in the water-in-oil emulsion, and one sample was treated with an aqueous solution prepared from phosphorous acid and dimethylamine again adding the phosphorous acid to the latex at a level of 5.9% based on the weight of the polymer contained in the water-in-oil emulsion. Results are shown in Table III.

TABLE III

STABILIZATION WITH PHOSPHOROUS ACID

| | | 40° C. Aging | | |
|---|---|---|---|---|
| Description | Latex pH | 5 days % Chrg. | 30 days % Chrg. | 92 days % Chrg. |
| Unstabilized (B) | 5.5 | 34.5 | — | — |
| $H_3PO_3$ | 1.0 | 31.8 | — | — |
| $H_3PO_3$/DMA (B+C) | 4.4 | 56.4 | 59.7 | 55.8 |

As the results show, phosphorous acid is ineffective at a pH of 1.0. However, at a pH of 4.4, phosphorous acid prevents degradation for up to 92 days at a temperature of 40° C. The unstabilized material likewise degrades rapidly and is not suitable for commercial use.

EXAMPLE IV

In this example, various ratios of phosphorous acid-dimethylamine solutions were added to a latex similar to that described as "B" above. Phosphorous acid was always present in the latex at a level of 5.9% based on the weight of the polymer in the latex. Aging studies were conducted at 40° C. and charge was determined by colloid titration. Results are shown in Table IV.

TABLE IV

STABILIZATION WITH PHOSPHOROUS ACID pH ADJUSTMENT WITH DIMETHYLAMINE

| pH | 35 days at Rm. Temp. % Chrg. | 21 days at 40° C. % Chrg. | 35 days at 40° C. % Chrg. | 50 days at 40° C. % Chrg. |
|---|---|---|---|---|
| 6.5 | — | 8.8 | — | — |
| 6.0 | — | 24.7 | 14.8 | — |
| 5.1 | 61.4 | 65.2 | 38.9 | — |
| 4.4 | — | 65.8 | 59.7 | 64.7 |
| 4.0 | — | 65.8 | 58.1 | 59.8 |
| 2.6 | — | 58.1 | 54.8 | 50.4 |

EXAMPLE V

This example shows the use of a phosphorous acid-sodium hydroxide aqueous solution as the stabilizing agent in this invention. This experiment conducted was similar to Example IV above and shows that other bases besides dimethylamine can be employed as stabilizing agents. Phosphorous acid was added to the latex at a level of 5.9% based on the weight of the polymer contained in the latex in all cases. Results are shown in Table V.

TABLE V

STABILIZATION WITH PHOSPHOROUS ACID pH ADJUSTMENT WITH SODIUM HYDROXIDE

| pH | 35 days at 40° C. % Chrg. | 50 days at 40° C. % Chrg. |
|---|---|---|
| 4.5 | 65.2 | 65.8 |
| 4.4 | 66.3 | 68.5 |

EXAMPLE VI

In order to show that it is not only the pH of the resultant latex which causes the stabilization but the presence of a sufficient quantity of phosphorous acid.

In three runs shown in the following table, phosphorous acid was added directly to the emulsion at a level of approximately 0.1% based on latex (0.3% based on the weight of polymer). Charge determinations were determined by colloid titration with results shown in Table VI.

TABLE VI

STABILITY OF pH ADJUSTED UNSTABILIZED MATERIALS

| pH | 8 days at 40° C. % Chrg. | 22 days at 40° C. % Chrg. |
|---|---|---|
| 5.9 (unadjusted) | 27.4 | 21.4 |
| 4.3 | 47.1 | 19.2 |
| 4.1 | 35.1 | 16.4 |

EXAMPLE VII

This example shows that all oxygen-containing halogen-free inorganic acids are not stabilizing agents for water-in-oil emulsions of the cationically modified quaternized acrylamide polymers of this invention. In the two examples below, a sample of latex was treated with a phosphoric acid-dimethylamine solution to provide approximately 2.4% phosphoric acid based on latex (7.7% based on polymer). Another sample was treated with a phosphorous acid-sodium hydroxide solution at a level of approximately 1.8% based on latex (5.8% based on polymer). Results of the cationic charge determinations at 40° C. are found in Table VII.

TABLE VII

STABILIZATION WITH OTHER PHOSPHOROUS CONTAINING ACIDS

| Stabilizer | % based on polymer | pH | 8 days at 40° C. % Chrg. | 22 days at 40° C. % Chrg. | 43 days at 40° C. % Chrg. |
|---|---|---|---|---|---|
| $H_3PO_4$/DMA | 7.7 | 4.2 | 34.5 | 35.1 | — |
| $H_3PO_2$/NaOH | 5.8 | 5.2 | — | 64.1 | 61.4 |

The mechanism of stabilization that is being carried out in this invention is not fully understood. However, several assumptions are involved and alternatives may exist. Quaternary amines are known to degrade under basic conditions via a Hoffmann elimination mechanism. In addition, hydrolysis can occur, producing methylol acrylamide. It is noted in working with low molecular weight solution polymers of materials of this type that the loss of cationic charge was pH dependent. This degradation was minimized by adjustment of the solution to a pH of 4.0. However, generation of methylol acrylamide still occurs although at a much reduced rate. In the case of a high molecular weight material, however, small amounts of methylol acrylamide can cause reaction between acrylamide and methylol polyacrylamide producing cross linking and insolubility of the resulting material. Methylol acrylamide apparently, however, reacts at a faster rate with phosphorous acid than acrylamide. This reaction is analogous to the mannich reaction and produces a methylol "phosphonate" typing up this material and not allowing it to react. After the phosphorous acid had been depleted, however, the rate of methylol formation is a function of initial inhibitor level and latex pH. For example, at pH's greater than 5, methylol acrylamide is generated faster than at pH 4. This depletes the inhibitor at a faster rate. After the scavenger has been depleted, product quality degeneration is somewhat rapid and cross linking occurs.

What is desired to be secured by Letters Patent and what I claim is as follows:

1. An improved process for the stabilization of water-in-oil emulsions of cationically modified acrylamide polymers of the type prepared by reacting an acrylamide polymer with formaldehyde and a secondary amine containing 2-8 carbon atoms followed by quaternization with an alkylating agent, said water-in-oil emulsion comprising:
  A. 5-60% by weight finely divided cationically modified acrylamide polymer;
  B. 5-75% hydrophobic oil;
  C. 20-90% by weight water; and
  D. 0.1-21% by weight oil-in-water emulsifying agent;
  the improved process comprising:
  A. Preparing an aqueous solution of a water soluble phosphorous containing compound having a P-H bond, said solution having a pH of from 1.5-4.5;
  B. Adding the aqueous solution of step A to the water-in-oil emulsion with agitation in a quantity to simultaneously:
    1. provide to the water-in-oil emulsion from 1.6-25% of the phosphorous containing compound based on the weight of the cationically modified acrylamide polymer present in the water-in-oil emulsion; and
    2. adjust the pH of said water-in-oil emulsion to from 3.5-5.0; and then, in the absence of heating,
  C. Recovering a stabilized water-in-oil emulsion of the cationically modified acrylamide polymer, said water-in-oil emulsion being readily invertible when added to water in the presence of a hydrophilic surfactant, the polymer contained in the water-in-oil emulsion being stabilized against cross linking.

2. The improved process of claim 1 wherein the phosphorous containing compound having a P-H bond is selected from the group consisting of orthophosphorous acid, hypophosphorous acid, sodium phosphite and sodium hypophosphite.

3. The improved process of claim 1 wherein the aqueous solution of the water soluble phosphorous containing compound having a P-H bond is prepared from water, phosphorous acid, and a base selected from the group of alkali metal hyrdoxides, lower alkyl primary amines, lower alkyl secondary amines, lower alkyl tertiary amines and ammonia.

4. The improved process of claim 1 wherein the phosphorous containing compound having a P-H bond is selected from the group consisting of orthophosphorous acid, hypophosphorous acid, sodium phosphite and sodium hypophosphite.

5. The improved process of claim 1 wherein the pH of the water-in-oil emulsion is adjusted to a level of from 4.0-4.4.

6. An improved process for the stabilization of water-in-oil emulsions of poly(N-acrylamidomethyl-N,N,N-trimethylammonium) chloride, said water-in-oil emulsions comprising:
  A. 5-60% by weight finely divided particles of poly(N-acrylamidomethyl-N,N,N-trimethylammonium) chloride;
  B. 5-75% hydrophobic oil;
  C. 20-90% by weight water; and
  D. 0.1-21% by weight water-in-oil emulsifying agent;
  the improved process comprising:
  A. Preparing an aqueous solution of a water soluble phosphorous containing compound having a P-H bond, said solution having a pH of from 1.5-4.5;
  B. Adding the aqueous solution of step A to the water-in-oil emulsion with agitation in a quantity to simultaneously:
    1. provide to the water-in-oil emulsion from 1.6-25% of the phosphorous containing compound based on the weight of the poly(N-acrylamidomethyl-N,N,N-trimethylammonium) chloride present in the water-in-oil emulsion; and
    2. adjust the pH of said water-in-oil emulsion to from 3.5-5.0; and then, in the absence of heating,
  C. Recovering a stabilized water-in-oil emulsion of poly(N-acrylamidomethyl-N,N,N-trimethylammonium) chloride, said water-in-oil emulsion being readily invertible when added to water in the presence of a hydrophilic surfactant, the polymer contained in the water-in-oil emulsion being stabilized against cross linking.

7. The improvement of claim 6 wherein the phosphorous containing compound having a P-H bond is phosphorous acid.

8. The improvement of claim 6 wherein the phosphorous containing compound having a P-H bond is selected from the group consisting of orthophosphorous acid, hypophosphorous acid, sodium phosphite and sodium hypophosphite.

9. The improved process of claim 6 wherein the pH of the water-in-oil emulsion is adjusted to a level of from 4.0-4.4.

* * * * *